(12) United States Patent
Iulita

(10) Patent No.: US 9,532,655 B2
(45) Date of Patent: Jan. 3, 2017

(54) SLIDING SEAT, IN PARTICULAR FOR GAMING STATIONS

(71) Applicant: STYLGAME S.R.L., Spilimbergo (PN) (IT)

(72) Inventor: Luigi Iulita, Spilimbergo (IT)

(73) Assignee: STYLGAME S.R.L., Spilimbergo (PN) (IT)

( * ) Notice: Subject to any disclaimer, the term of this patent is extended or adjusted under 35 U.S.C. 154(b) by 0 days.

(21) Appl. No.: 14/443,545

(22) PCT Filed: Jan. 20, 2014

(86) PCT No.: PCT/IB2014/058404
§ 371 (c)(1),
(2) Date: May 18, 2015

(87) PCT Pub. No.: WO2014/118667
PCT Pub. Date: Aug. 7, 2014

(65) Prior Publication Data
US 2015/0289662 A1    Oct. 15, 2015

(30) Foreign Application Priority Data

Jan. 29, 2013  (IT) .............................. PN20130003 U
Jan. 29, 2013  (IT) .............................. PN20130004 U

(51) Int. Cl.
*A47C 1/00*     (2006.01)
*A47C 15/00*    (2006.01)
(Continued)

(52) U.S. Cl.
CPC ............... *A47C 15/004* (2013.01); *A47C 3/00* (2013.01); *A47C 9/022* (2013.01); *A63F 13/08* (2013.01); *G07F 17/3202* (2013.01)

(58) Field of Classification Search
CPC ............................. A47C 9/022; G07F 17/3202
(Continued)

(56) References Cited

U.S. PATENT DOCUMENTS 520,702 A * 5/1894 Palmberg ............... A47B 39/02
                                              297/172
4,560,200 A * 12/1985 Giannelli ............... A47C 9/022
                                              297/172
(Continued)

FOREIGN PATENT DOCUMENTS

EP    1 767 394 A2    3/2007
ES    2 379 186 A1    4/2012
(Continued)

OTHER PUBLICATIONS

May 13, 2014 International Search Report issued in International Application No. PCT/IB2014/058404.

(Continued)

*Primary Examiner* — Laurie K Cranmer
(74) *Attorney, Agent, or Firm* — Oliff PLC

(57) ABSTRACT

A sliding seat, in particular for gaming stations, includes a seating portion defined by at least one substantially horizontal seating plane supported by a support device on a support base. The support base has a plate that can be joined to the support device and is slidably connectable to a footboard resting upon the floor, the footboard being provided with a guide device cooperating with corresponding a sliding device provided on the plate to allow the plate to slide together with the seating portion. In particular, in the sliding seat, the length of the plate is greater than or equal to half the distance between the surface of the plate and the seating plane.

9 Claims, 10 Drawing Sheets

(51) Int. Cl.
*A47C 9/02* (2006.01)
*A63F 13/90* (2014.01)
*A47C 3/00* (2006.01)
*G07F 17/32* (2006.01)

(58) Field of Classification Search
USPC .................................. 297/344.1, 311, 217.7
See application file for complete search history.

(56) References Cited

U.S. PATENT DOCUMENTS

| | | | | |
|---|---|---|---|---|
| 4,840,343 | A * | 6/1989 | Gasser | A47C 7/002 248/500 |
| 5,083,738 | A * | 1/1992 | Infanti | A47C 15/004 248/225.11 |
| 5,102,192 | A * | 4/1992 | Barile, Sr. | A47C 15/004 248/501 |
| 5,409,296 | A * | 4/1995 | Barile | A47C 9/022 248/172 |
| 5,522,641 | A * | 6/1996 | Infanti | A47C 9/00 297/172 |
| 5,542,748 | A * | 8/1996 | Barile | A47C 9/00 248/500 |
| 5,678,886 | A * | 10/1997 | Infanti | A47C 9/00 248/500 |
| 5,762,617 | A * | 6/1998 | Infanti | A47C 9/00 297/344.13 |
| 5,791,731 | A * | 8/1998 | Infanti | A47C 9/00 297/172 |
| 6,227,614 | B1 * | 5/2001 | Rubin | A47C 9/022 297/143 |
| 6,345,874 | B2 * | 2/2002 | Duong | 248/500 |
| 6,354,660 | B1 * | 3/2002 | Friedrich | A47C 15/004 248/500 |
| 6,572,187 | B2 * | 6/2003 | Laufer | A47C 9/06 297/217.1 |
| 6,692,051 | B1 | 2/2004 | Cook et al. | |
| 7,407,228 | B1 * | 8/2008 | Infanti | A47C 3/18 248/500 |
| 7,658,445 | B2 * | 2/2010 | Mittler | A47C 15/004 297/217.3 |
| 7,832,799 | B2 * | 11/2010 | Davis, Jr. | A47C 15/004 248/500 |
| 8,636,570 | B2 * | 1/2014 | Tastad | A47C 7/72 297/217.1 |
| 2008/0136228 | A1 * | 6/2008 | Friedrich | A47C 7/002 297/217.3 |
| 2011/0003631 | A1 | 1/2011 | Tastad | |
| 2011/0168077 | A1 * | 7/2011 | Bostrom | A47C 9/022 114/363 |

FOREIGN PATENT DOCUMENTS

FR 2 895 219 A1 6/2007
WO WO 2005117648 A1 * 12/2005 ............. A47C 9/022

OTHER PUBLICATIONS

May 13, 2014 Written Opinion issued in International Application No. PCT/IB2014/058404.

* cited by examiner

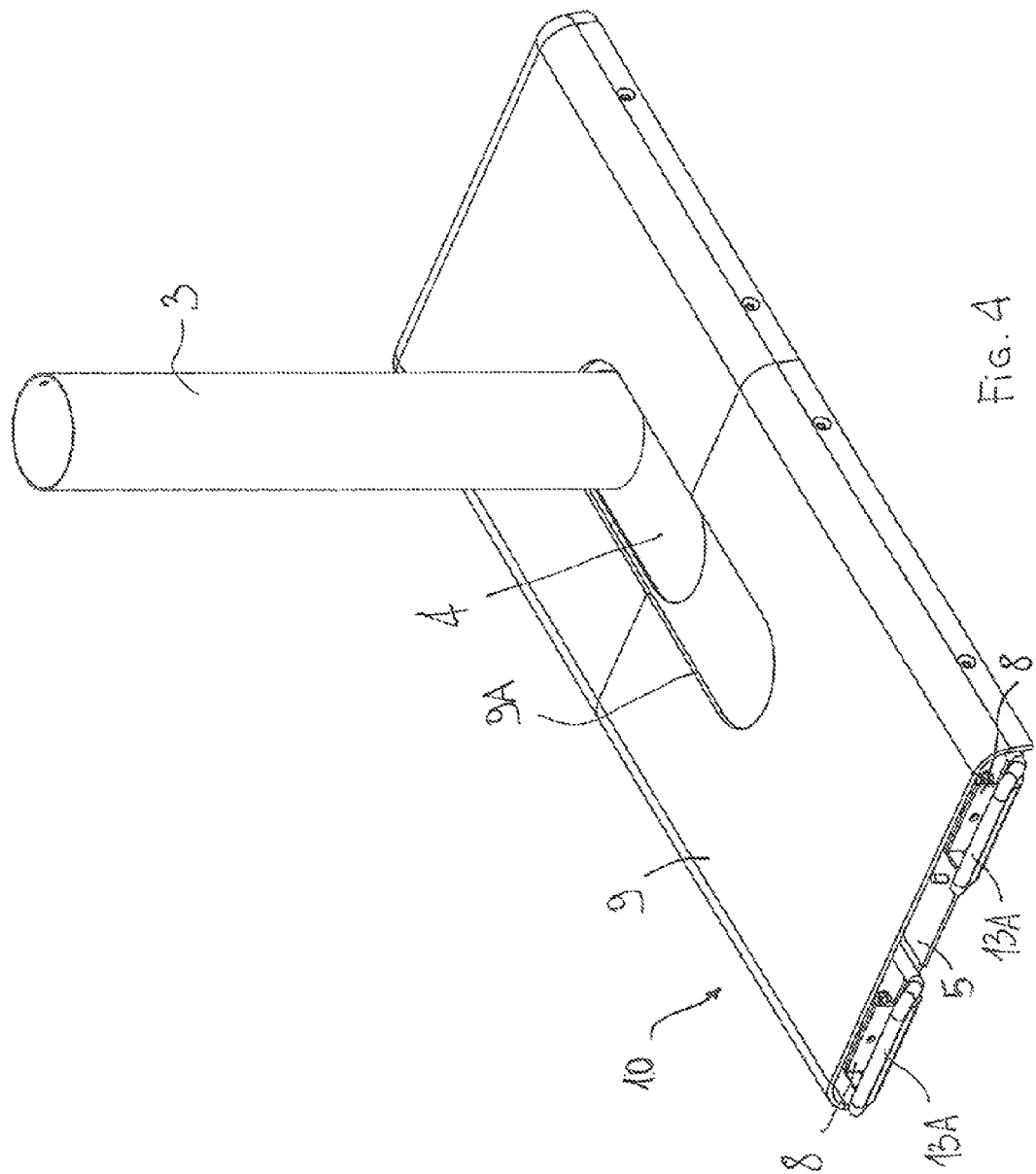

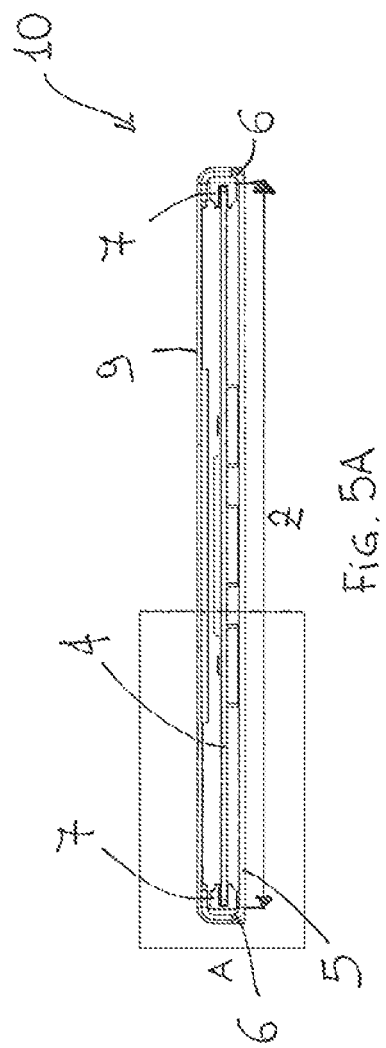
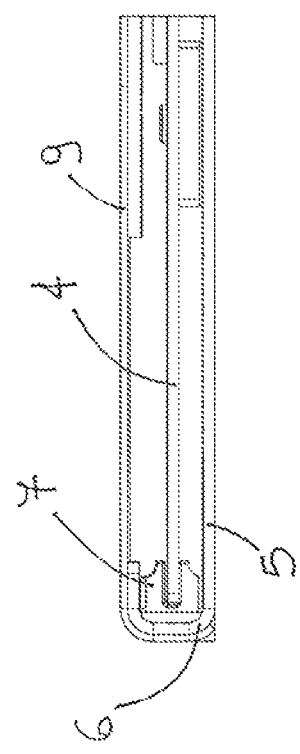
Fig. 5A
Fig. 5B

SLIDING SEAT, IN PARTICULAR FOR GAMING STATIONS

The present invention refers to a sliding seat, preferably suitable to be used for creating a gaming station for automatic machines, such as for example slot machines and video games. In particular, the present invention concerns a sliding seat, whose distance from the display/monitor of the automatic gaming machine is adjustable, advantageously also during a gaming session.

Generally, in the use of any device provided with a luminous monitor of substantially standard size, in order to favour a correct posture and avoid straining the eyes, it is a good practice to ensure that the distance between the position of the user and the monitor is less than 1 meter, preferably between 50 and 70 cm. Variations within this range are subjective and depend on the perception of each individual user.

This concept can be applied for gaming stations arranged for example in dedicated gaming rooms, where the users can remain continually seated in their position for extended periods, even as long as 12 hours, according to recent studies in the field.

However, the gaming stations currently used include a seat, generally supported by an upright element, and resting on the floor through a fixed support base arranged at a certain distance from the automatic gaming machine. In this arrangement, the distance of the seat from the monitor can be adjusted iteratively by the user, by interrupting the gaming session and moving the seat using a trial-and-error method until the best position is found.

The objective of the subject matter of the present invention is to overcome the above-mentioned drawbacks, by designing a seat, in particular for gaming stations, that makes possible to adjust the distance of the seat from the monitor.

In the scope of the above objective, a purpose of the present invention is to devise a sliding seat that can be automatically, quickly and easily adjustable, without having to interrupt the gaming session.

A further purpose of the present invention is to provide a sliding seat that can stably maintain the position desired by the user.

One not less important purpose of the present invention is to provide a sliding seat that can house and protect any electrical cables that supply power to the seat itself or to control devices mounted on the seat, thereby guaranteeing a high degree of safety for the user.

A further objective of the present invention is to provide a sliding seat that is removably connected to an automatic gaming machine, without the use of external fastening means, to enable it to be rapidly connected/disconnected.

The above-mentioned purpose, objectives and advantages, as well as others that will become evident in the following description, will be achieved with a sliding seat, in particular for gaming stations as defined in claim 1.

The subsequent claims define additional characteristics of the present invention, which will be better illustrated in the description of particular, but not exclusive, embodiments illustrated by way of example but without limitations in the enclosed drawings, wherein:

FIG. 4 is a perspective view of the sliding seat according to the present invention, wherein the seating portion is not shown;

FIG. 5A shows, in cross section, a variant embodiment of the footboard of a seat according to the present invention;

FIG. 5B shows an enlarged detail of the footboard of FIG. 5A;

Figure 1:
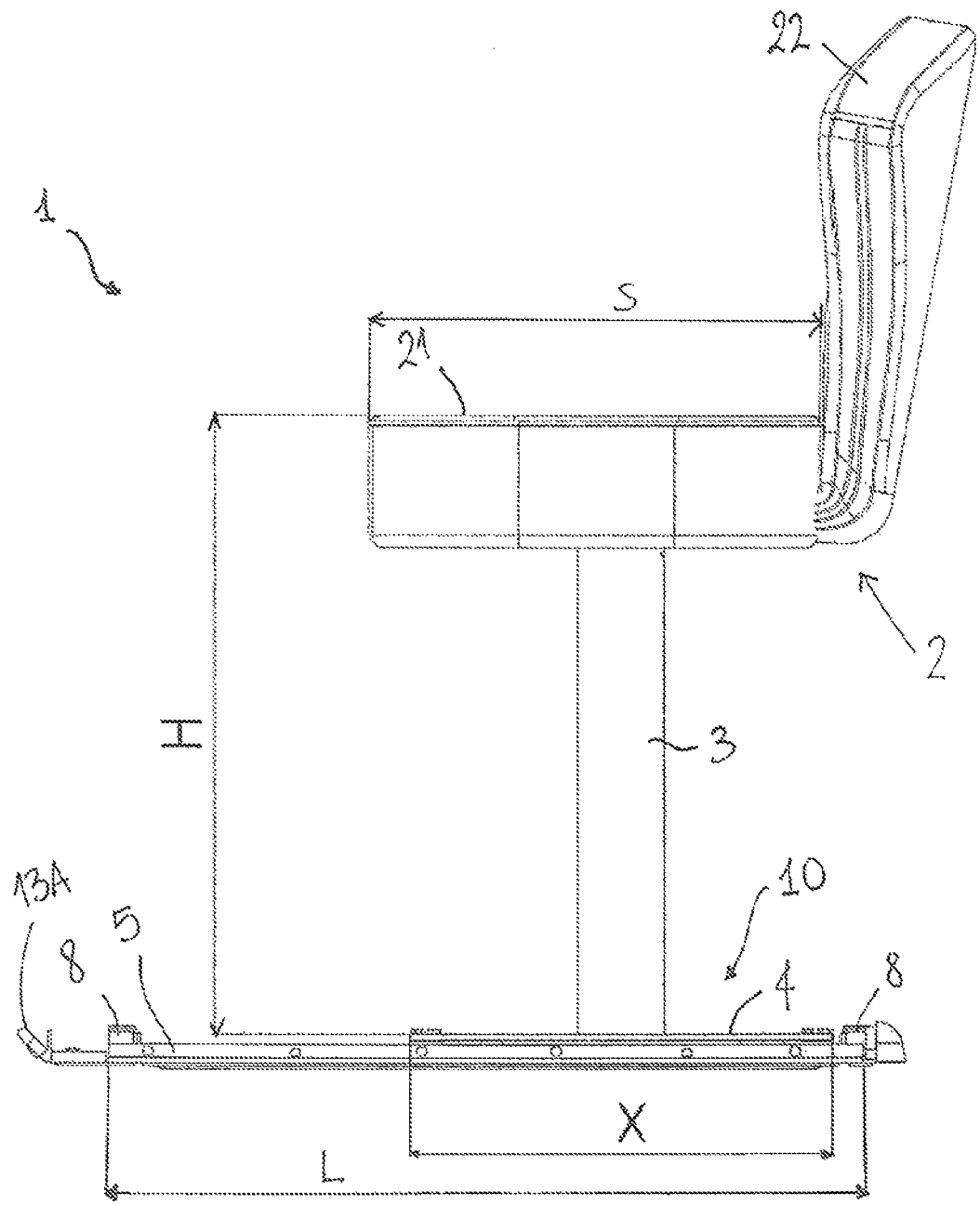
FIG. 1 shows, in a side view, a sliding seat according to the present invention.

With reference to the previously mentioned figures, in particular FIG. 1, reference numeral 1 indicates a sliding seat, in particular for gaming stations.

Said sliding seat 1 comprises a seating portion 2 defined by a seating plane 21 substantially horizontal and possibly provided with a back rest 22. Support means 3, preferably consisting of an elongate tubular upright element, support said seating portion 2 at a desired height on a support base 10 comprising a plate 4 and a footboard 5 resting upon the floor.

In particular, said upright 3 is connected at one end to said seating portion 2, and at the opposite end it can be linked to said plate 4, preferably on a substantially central area of the same plate, arranged so that the distance H between said seating plane 21 and the surface of said plate 4 is preferably included in a range between 48 and 60 cm.

According to a characteristic of the present invention, said plate 4 is slidably attached to said footboard 5, which has preferably a width at least equal to the width Z of the plate 4 and a length L greater than the length X of the plate 4. Obviously, the width Z of the plate 4 is suitable to give the desired stability to the player sitting on the seating portion 2.

Figure 3:
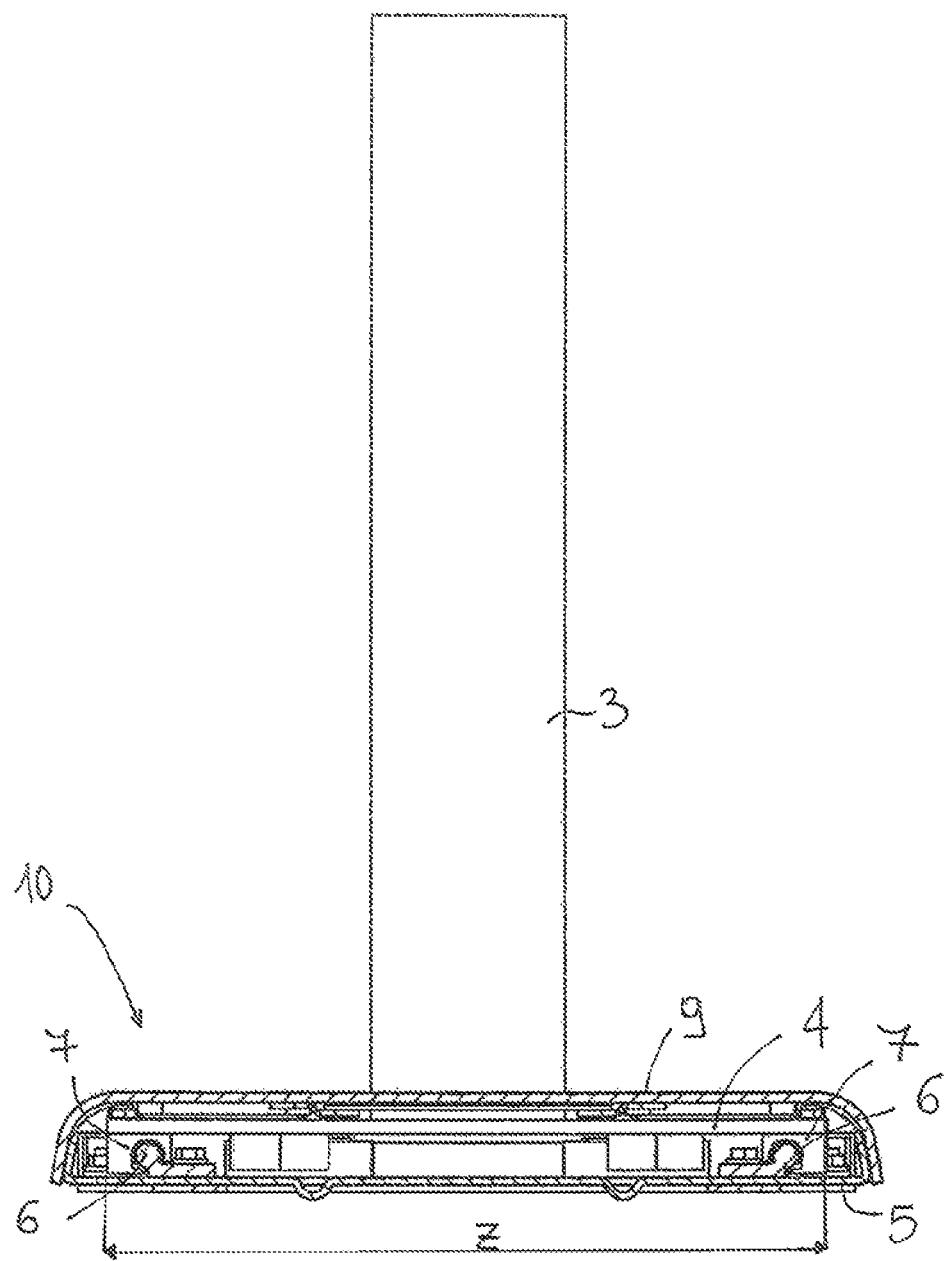
FIG. 3 is a cross-sectional view of a sliding seat according to the present invention, wherein the seating portion is not shown.
Figure 6:
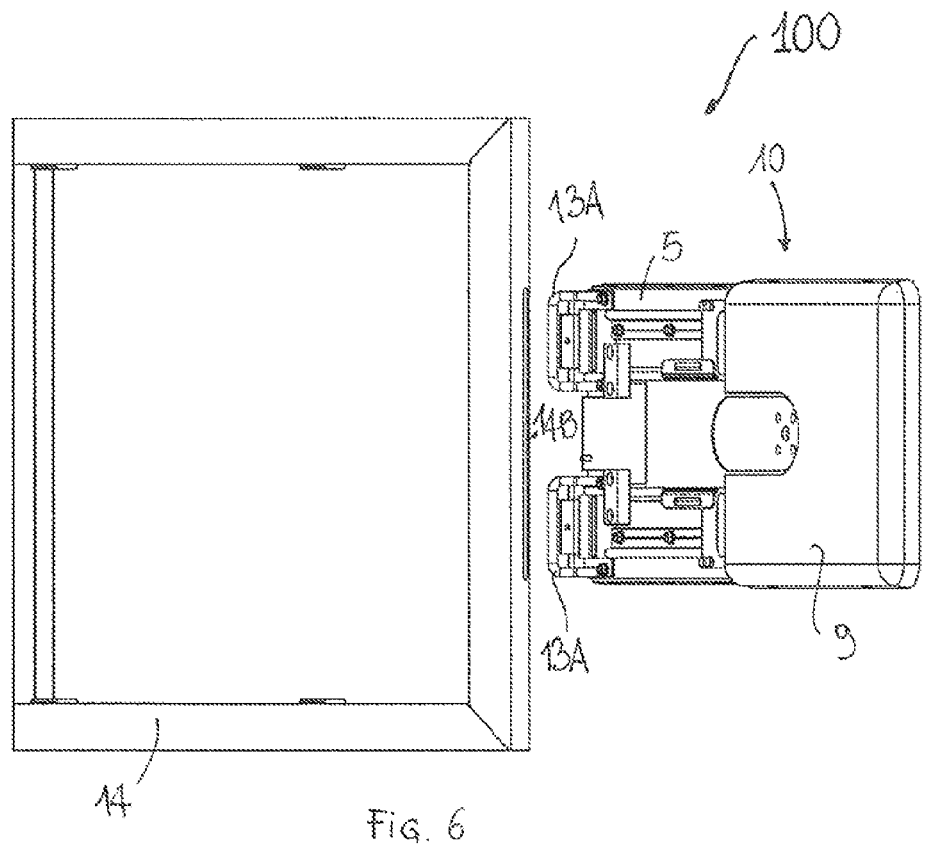
FIG. 6 illustrates, in a view from above, a seat according to the present invention that can be coupled to the support member of an automatic machine.

To allow the sliding movement of the plate 4, and with it that of the upright 3 and the seating portion 2, the footboard 5 includes guide means 6 that extend preferably along the entire length L of the footboard 5, and that are suitable to cooperate with corresponding sliding means 7 provided on said footboard 4; in particular, as shown in FIG. 3, said guide means 6 may include a pair of parallel guideways, formed, for example, by rods of round cross section, cooperating with corresponding counter-shaped sliding blocks 7 arranged on the surface of said plate 4 facing the footboard 5.

According to a particularly advantageous variant embodiment of the present invention, which makes it possible to limit/minimize the thickness of the support base 10, said guide means 6 can be made from the lengthwise edges L of said footboard 5, suitably shaped so as to cooperate with counter-shaped elements 7 coupled to the corresponding edges of the plate 4, as shown in FIGS. 5A and 5B.

In this manner, by suitably arranging said support base 10 in front of an automatic gaming machine, it is possible to adjust the distance of the seating portion 2 from the monitor of the machine, based on the requirements of the user.

Figure 2A:
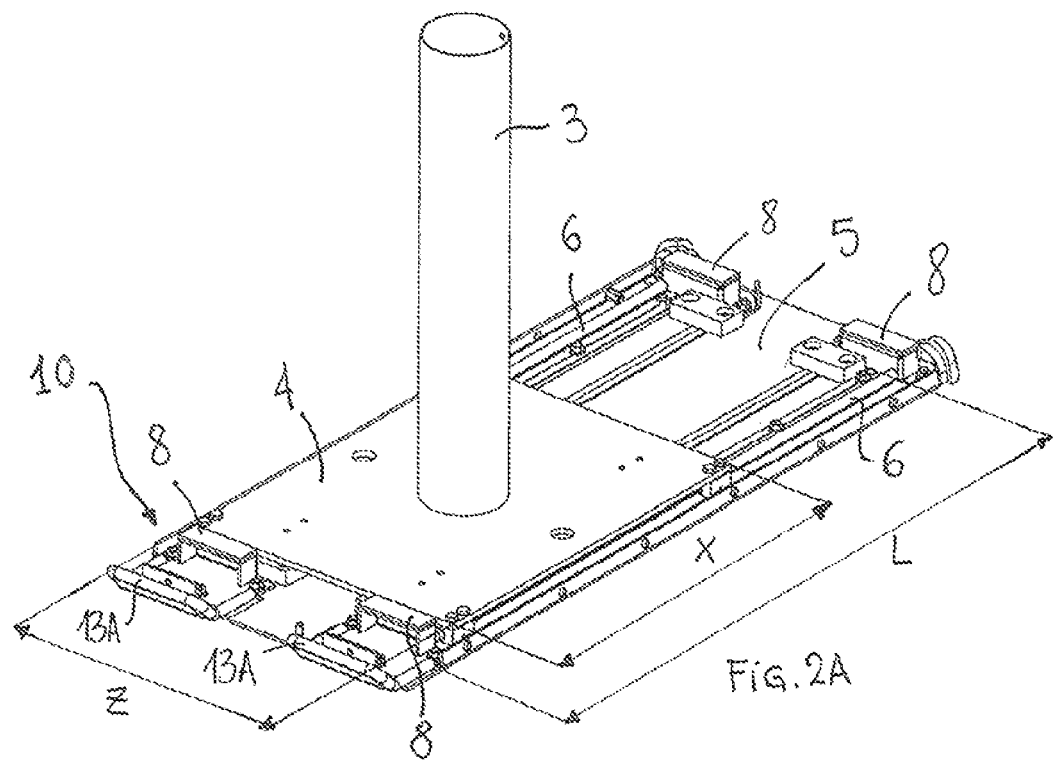
FIGS. 2A and 2B are perspective views, in the two end-stop positions, of a sliding seat according to the present invention, wherein the seating portion is not shown.
Figure 2B:
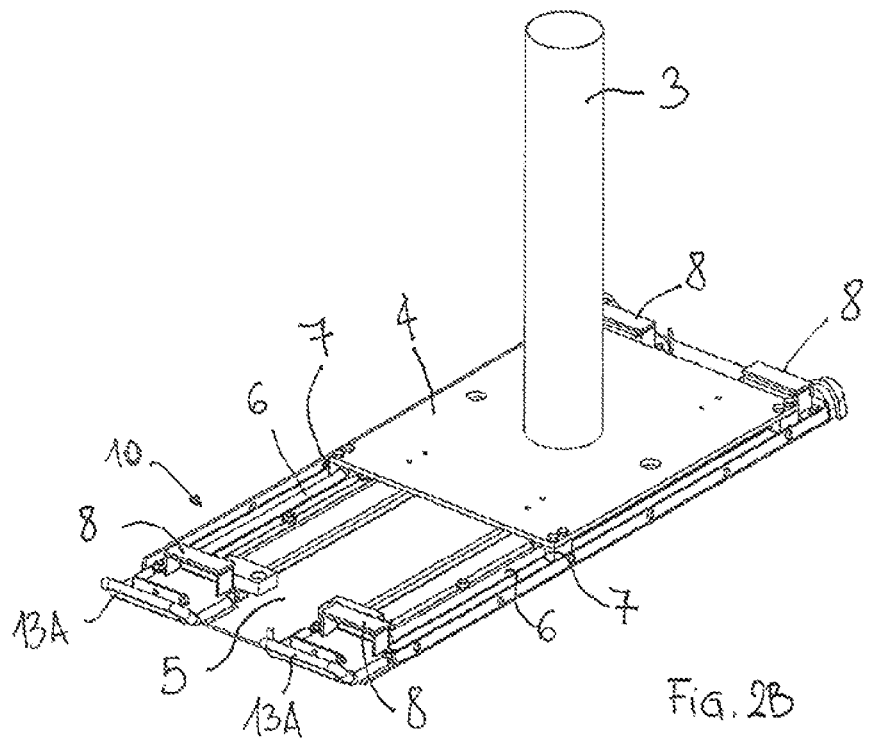

Advantageously, said footboard 5 is provided with abutment means 8, placed preferably at the ends of the guide means 6, to form the end stops, in both directions, for the travel of said plate 4 on said footboard 5, as shown in FIGS. 2A and 2B.

Moreover, preferably, the support base 10 includes a protection structure 9, formed by one of more shells, arranged as a cover of said footboard 5 and of said plate 4; advantageously, said cover structure 9 is provided, in a central portion, with a slotted opening 9A that allows the support upright 3 to move as one with the plate 4. Any electrical cables, suitable to supply power to the seat or the control devices provided on the seat, can be advantageously housed within the support base 10: in this manner, it is possible to guarantee the maximum safety for the user, while maintaining the appearance of the seat 1.

According to a particularly advantageous characteristic of the present invention, it was found that if the length X of the plate 4 is greater than or equal to half the distance H between the upper surface of the plate 4 and the seating plane 21, the sliding movement of the plate 4 on the guideways 6 of the footboard 5 to control the position of the seating portion 2 with respect to the automatic gaming machine can also be accomplished "under load", that is, when the user is using the seat while sitting on the seating portion 2, thus without having to interrupt the gaming session.

In fact, it was proved that for length dimensions X of the plate 4 smaller than those specified above, the distribution of the loads is not optimal, and consequently the seat does not slide smoothly along the guideways 6, thus making it quite difficult, if not practically impossible, to control its movement "under load".

In addition, advantageously, the length X of the plate 4 is substantially equal to the depth S of the seating plane 21 and, preferably, said upright 3 extends from a central area of the plate 4, that is, substantially halfway along the length X of the plate 4, and is connected to the seating portion 2 in a central area of the seat itself, that is, substantially halfway along the depth S.

In fact, it was found that, if the player sitting in the playing position tries to impart a translational movement, generally by pushing with the feet against the support base of the automatic gaming machine arranged before him to adjust the position of the seating portion 2 with respect to the monitor, thanks to the balance of the forces and of the momentums applied on the plate 4, the dimensions specified above make it possible to easily and effortlessly overcome the static friction but at the same time they hinder the undesirable movement of the plate 4 due for example to involuntary movements of the user during a playing action.

A sliding seat 1 according to the present invention is also suitable to be removably joined to an automatic gaming machine support member 14, possibly housed inside a cabinet, on a support plane, such as a for example the floor, for creating a gaming station 100.

According to an advantageous characteristic of the present invention, the connection between said seat 1 and said support member 14, preferably formed from hollow structural elements, can be achieved without the use of external fastening means, thanks to the use of suitable connecting means 13A provided on said support base 10, and in particular on said footboard 5, suitable to cooperate with corresponding engaging means 14A provided on the automatic machine support member 14.

In particular, said connecting means 13A and said engaging means 14A are made in such a way that when said support base 10 lies in a first position, inclined with respect to said support plane, said connecting means 13A can be connected to and disconnected from said engaging means 14A; on the other hand, when said support base 10 is set in a second position, resting on the support base, the support base 10 and the support member 14 are joined together thanks to the engagement of said connecting means 13A with said engaging means 14A.

More particularly, preferably said connecting means 13A include one or more projecting portions, as shown in the enclosed figures, that extend from an edge portion of said support base 10, and in particular of said footboard 5; advantageously, said projecting portions 13A are inclined with respect to the plane defined by the support base 10.

Said engaging means 14A preferably consist, instead, of one or more housing seats formed inside said support base 14 and preferably provided with a slotted access opening 14B.

Figure 7:
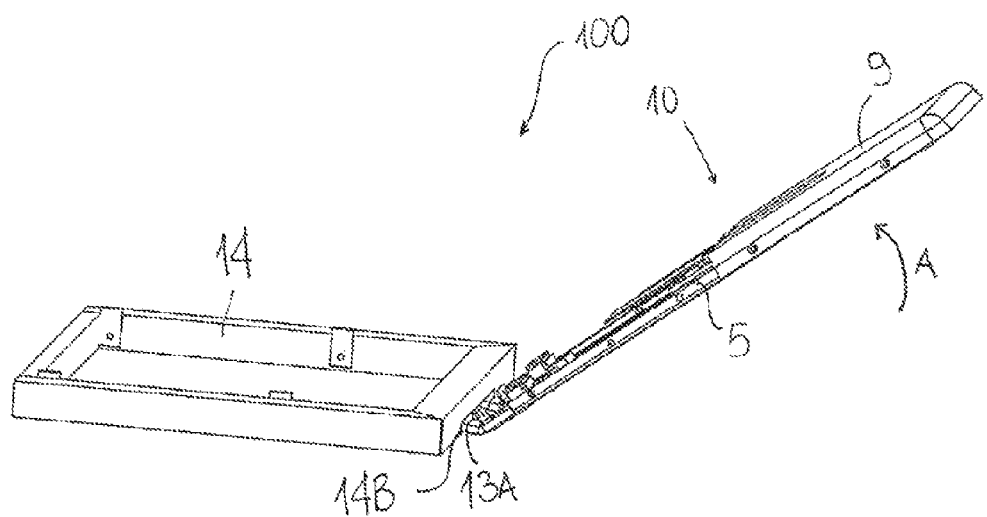
FIG. 7 illustrates, in a perspective view, the coupling between the support base of the seat according to the present invention and the support member of an automatic gaming machine.

To achieve the detachable coupling between the support base 10 of the sliding seat 1 and the automatic machine, it is necessary to insert said projecting portions 13A inside said corresponding housing seats 14A: in order to do so, it is necessary to set the support base 10 in a first inclined position with respect to the support plane, by rotating it in the direction of the arrow A in FIG. 7, so that said projecting portions 13A are substantially parallel to the support plane.

Figure 8A:
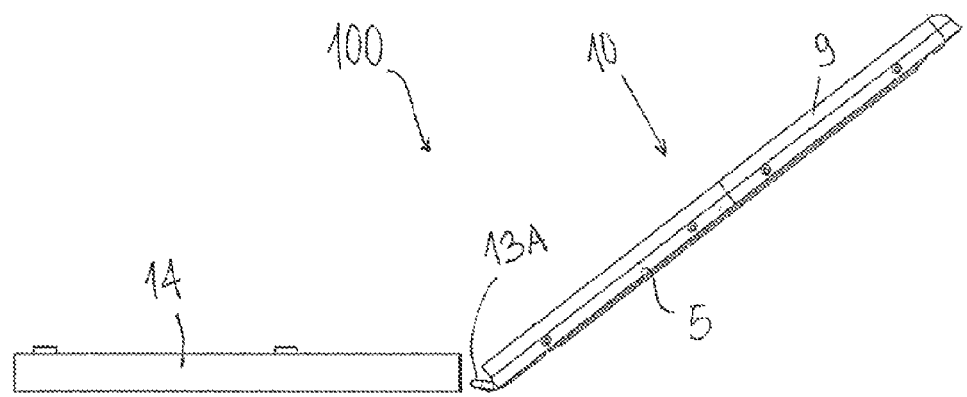
FIGS. 8A, 8B and 8C illustrate a sequence of phases to carry out to achieve the connection between the support base of the seat according to the present invention and the support member of an automatic machine so as to form a gaming station.
Figure 8B:
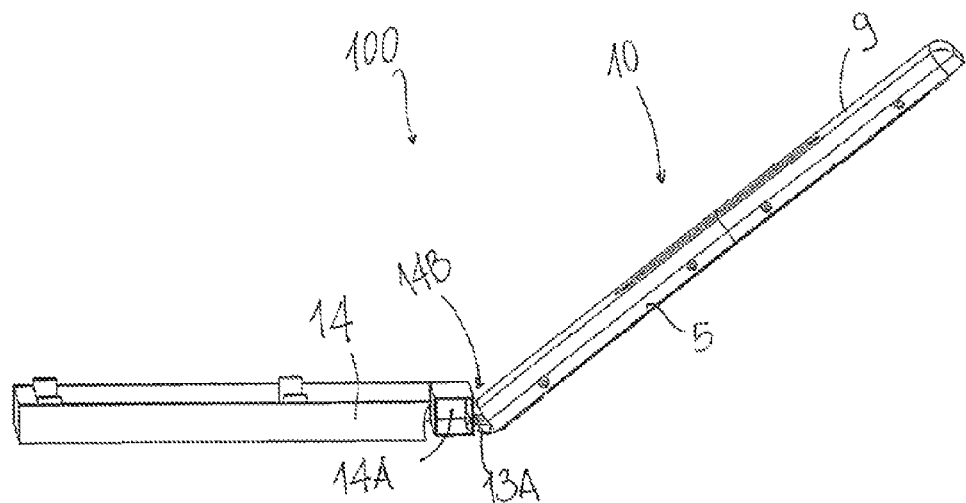

When said support base 10 is set in said first position, said projecting portions 13A can be freely inserted into said housing seats 14A, since the access openings 14B allow their insertion (FIGS. 8A and 8B).

Figure 8C:
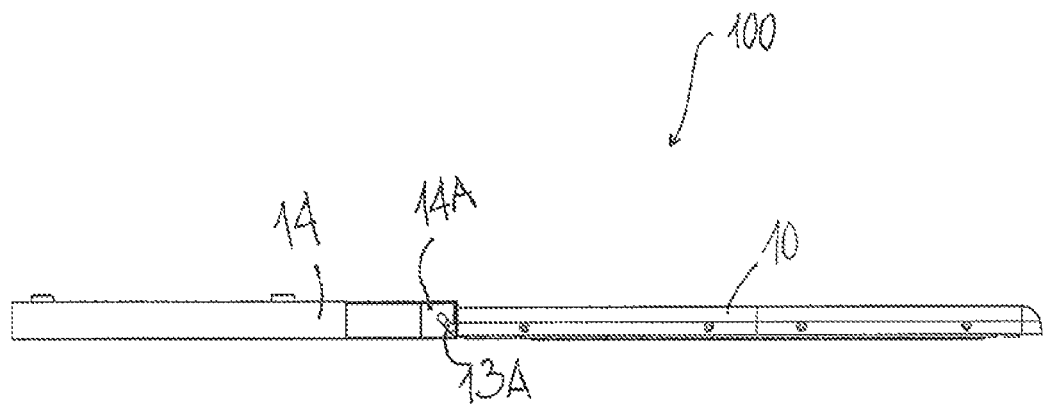

At this point, a subsequent rotation of the support base 10 in the direction opposite to that of the arrow A brings the footboard to a second position, resting on the support plane; this operation causes a rotation of the projecting portions 13A inside said housing seats 14A, which determines their stable engagement because, in such position, said access openings 14B prevent the projecting portions from being pulled out (FIG. 8C).

Figure 9:
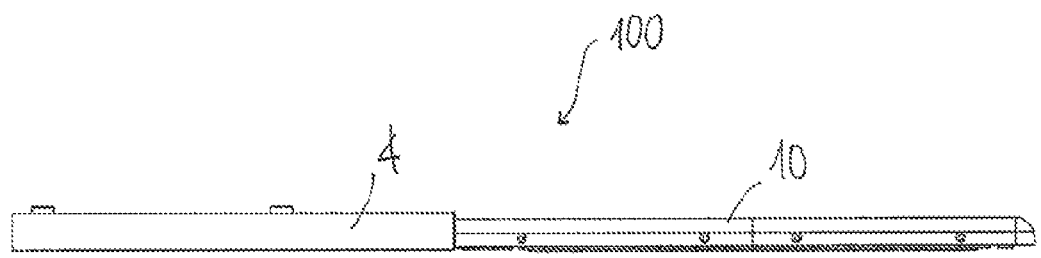
FIG. 9 is a side view that illustrates the connection between the support base of the seat according to the present invention and the support member of an automatic gaming machine.

In this manner, as shown in FIG. 9, the support base 10 and the support member 14 are stably joined to each other. However, such connection is removable: in fact, by rotating said support base 10 again in the direction of the arrow A to return it to said first position, the projecting portions 13A resume a position substantially parallel to the support plane that allows them to be axially pulled out of the corresponding housing seats 14A, thus freeing the support base 10 from its connection with the support member 14.

Figure 10:
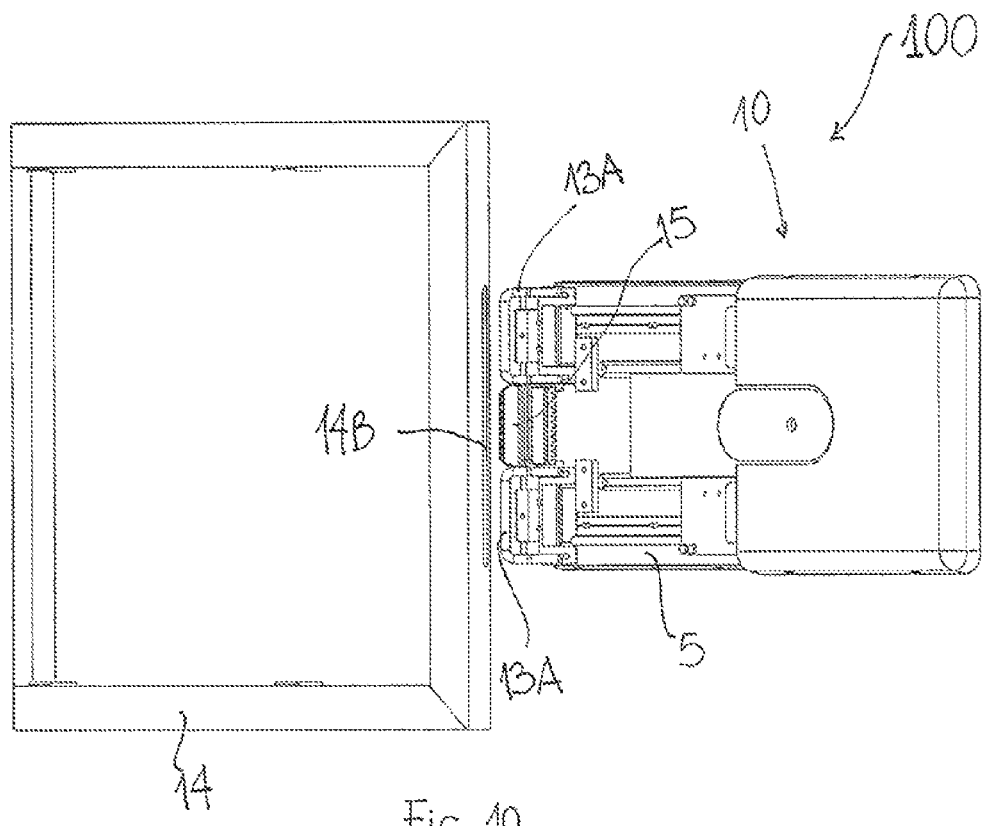
FIG. 10 illustrates, in a view from above, an advantageous embodiment of a seat according to the present invention.
Figure 11:
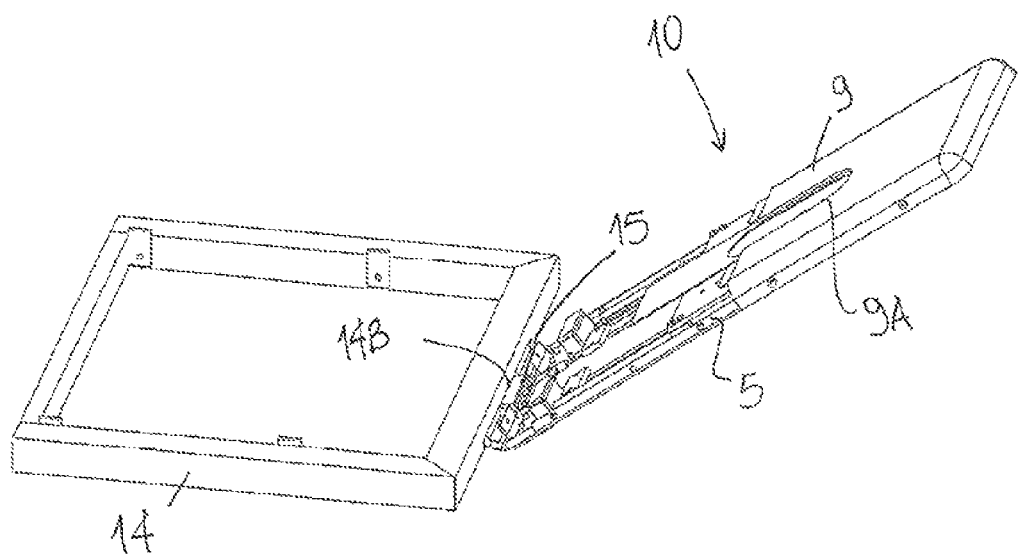
FIG. 11 illustrates, in a perspective view, the connection between the base of the seat of FIG. 10 and the support member of an automatic gaming machine.

If desired, as shown in FIGS. 10 and 11, said footboard 5 can be provided, at an edge portion adjacent to said projecting portions 13A, with first electrical contacts 15, such as one or more terminal boards, suitable to be operatively connected to corresponding second electrical contacts 16 provided on the automatic machine support member 14, an in particular inside the housing seats 14A, to feed electric current to the seat or to control devices located on the seat when the support base 10 is in said second position.

Figure 12A:
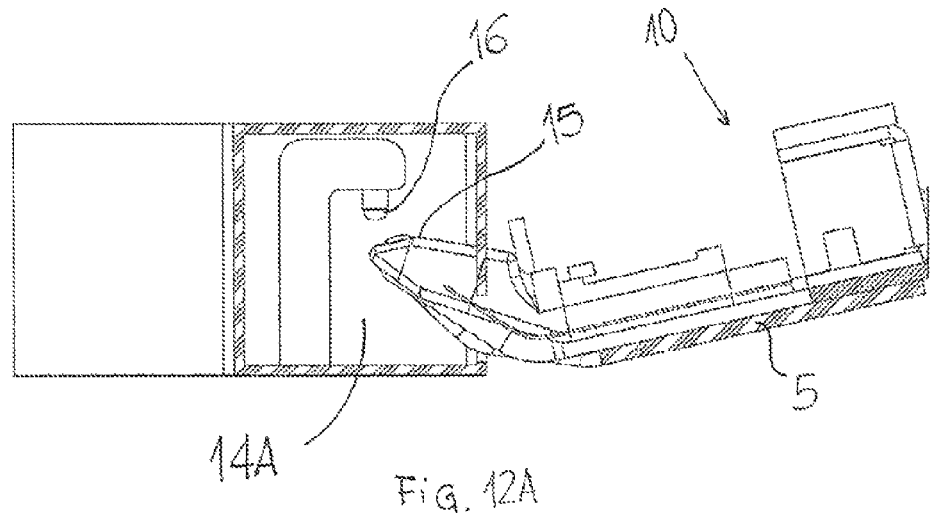
FIGS. 12A and 12B illustrate, in cross-sectional views, an enlarged detail of two coupling phases between the support base of the seat of FIGS. 10 and 11 and the support member of an automatic gaming machine.
Figure 12B:
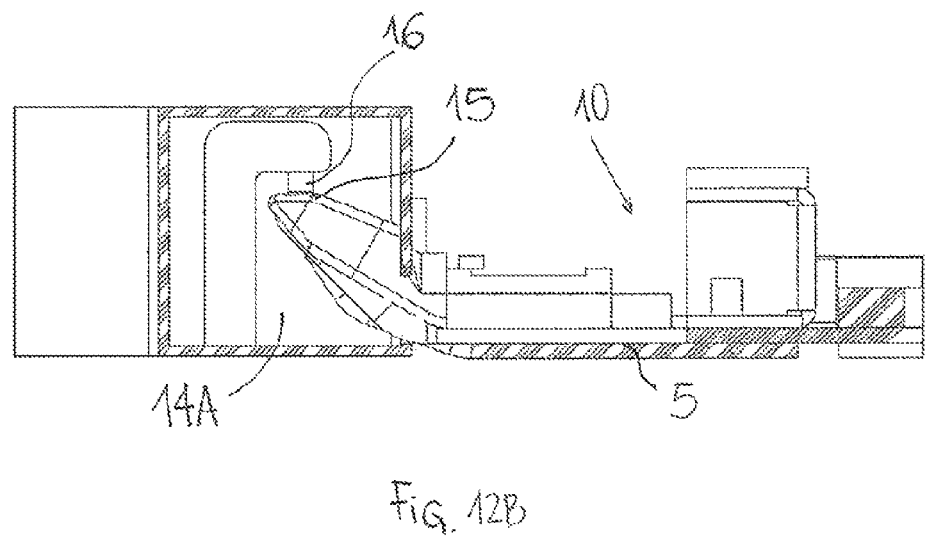

In particular, advantageously said first and said second electrical contacts 15, 16 are made in such a manner that their connection is not possible when said support base 10 is in the first position nor during the passage from said first to said second position, as can be seen in FIG. 12A, but is completely possible only when the support base 10 is in said second position, as shown in FIG. 12B. In this manner, electric power is not fed to the seat 1 during the coupling operations between the base 10 and the automatic machine, thus guaranteeing a greater degree of safety.

In conclusion, from the above it is evident that the present invention achieves the initially foreseen purposes and advantages: in fact, a sliding seat has been devised that is particularly suitable to be used for creating gaming stations, that makes it possible to adjust the distance of the seating portion from the monitor of an automatic gaming machine.

Further, if some proportions between the seating height and the dimensions of the sliding plate, calculated as explained above, are respected, it is surprisingly proved that the movement of the seat is smooth even "under load", that is, when the player is sitting on the seating portion: in this manner, the adjustment of the distance of the seat from the monitor is made easy even without having to interrupt the playing session in progress.

At the same time, however, involuntary translational movements of the plate during the playing action are prevented without the need to provide mechanical stops to lock the seat in the desired position, as the player's weight is sufficient to do so.

Furthermore, the sliding seat of the present invention is advantageously removably connectable to an automatic gaming machine without requiring additional fastening means, so that such operation can be carried out in a simple and rapid manner.

In a particularly advantageous embodiment of the invention, the coupling between the base of the seat and the automatic machine also realizes at the same time the electrical connection, so that electrical current can be supplied to the seat or to the control devices foreseen on the seat; in particular, this takes place automatically together with the coupling of the support base, thus without requiring further operations, and safely.

Naturally, the present invention is susceptible of many modifications or variants without thereby departing from the scope of patent protection as defined in any of the enclosed independent claims.

Moreover, the materials used to implement the present invention as well as the forms and dimensions of the individual components, can be the most suitable to meet the specific requirements.

The invention claimed is:

1. A sliding seat, adapted to be arranged in front of an automatic gaming machine, comprising:
    a seating portion defined at least by a substantially horizontal seating plane supported on a support base by a support means,
    wherein:
        said support base includes a plate adapted to be joined to said support means and that is slidably connected to a footboard supported on a floor,
        said footboard is provided with guide means cooperating with corresponding sliding means provided on said plate to allow said plate to slide together with said seating portion, and said footboard has a width at least equal to a width of said plate and a length greater than a length of said plate,
        said length of said plate is greater than or equal to half a distance between a surface of said plate and said seating plane, and
        said support means includes an elongate upright arranged in a central area of said plate, and said length of said plate is substantially equal to a depth of said seating plane.

2. The sliding seat according to claim 1, wherein said guide means comprise at least one pair of rectilinear and parallel sliding guideways extending along said length of said footboard, said sliding means is formed by counter-shaped sliding blocks provided on surface of said plate facing said footboard.

3. The sliding seat according to claim 2, in which said footboard includes an abutment means arranged at ends of said guide means to form end stops for travel of said plate.

4. The sliding seat according to claim 1, wherein said guide means are formed from shaped lateral edges of said footboard, said sliding means includes counter-shaped elements connected to corresponding edges of said plate.

5. The sliding seat according to claim 1, wherein said support base also includes a cover structure provided, in a central portion, with a slotted opening for passage of said support means.

6. The sliding seat according to claim 1, wherein said support base includes a connecting means adapted to cooperate with a corresponding engaging means provided on a support member of said automatic gaming machine at a rest plane to removably connect said support base to said member, said support base being movable between a first position, inclined with respect to said rest plane, in which said connecting means can be connected to and disconnected from said engaging means, and a second rest position on said rest plane, in which said support base is joined to said support member through the engagement of said connecting means with said engaging means.

7. The sliding seat according to claim 6, in which said connecting means include projecting portions that extend from an edge portion of said support base and are inclined with respect to a plane defined by said support base, said engaging means comprising corresponding housing seats, and are accessed by slotted openings.

8. The sliding seat according to claim 6, in which said support base also includes first electrical contacts adapted to be operatively connected to corresponding second contacts provided on said automatic gaming machine when said support base is in said second position.

9. A gaming station comprising a sliding seat according to claim 1, connected to a support member of said automatic gaming machine.

* * * * *